H. A. DENISON.
DETACHABLE TREAD FOR TRACTION WHEELS.
APPLICATION FILED NOV. 17, 1917.
1,377,321.
Patented May 10, 1921.
3 SHEETS—SHEET 1.
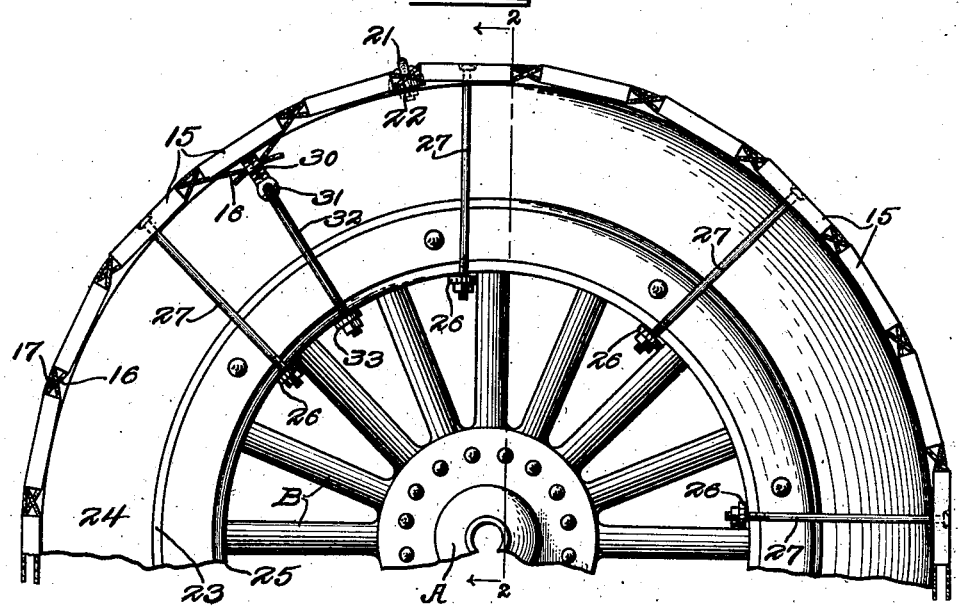
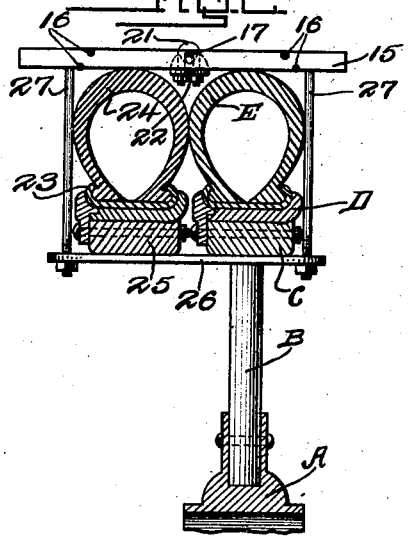
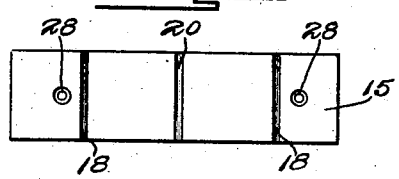
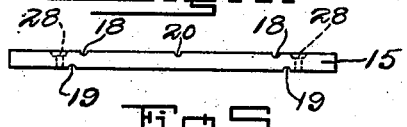
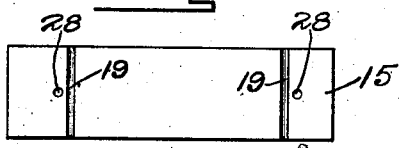
Inventor
Henry A. Denison H. A. DENISON.
DETACHABLE TREAD FOR TRACTION WHEELS.
APPLICATION FILED NOV. 17, 1917.

1,377,321.

Patented May 10, 1921.

Inventor
Henry A. Denison.
By Lancaster and Allwine
Attorneys

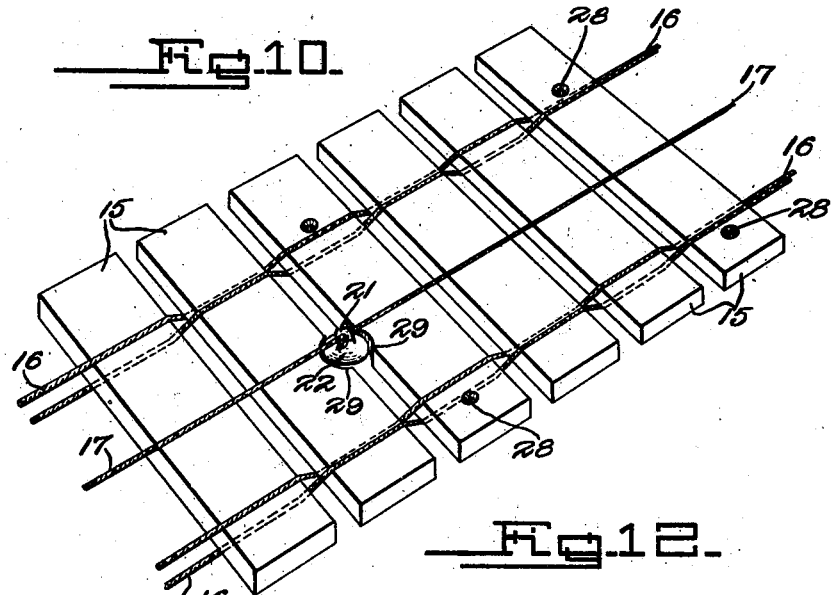
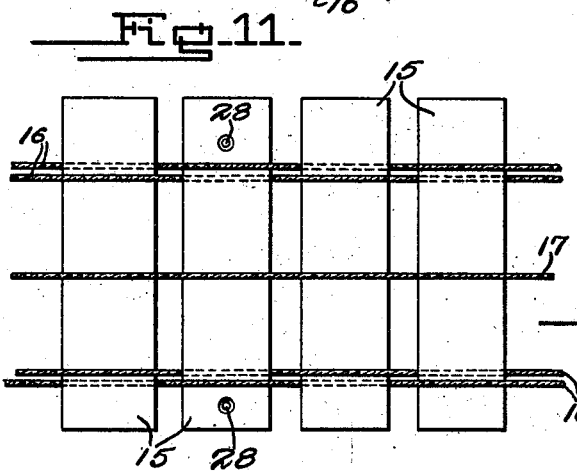
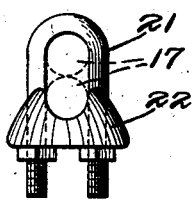
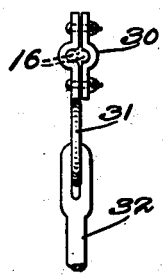

UNITED STATES PATENT OFFICE.

HENRY A. DENISON, OF WATERVILLE, MAINE.

DETACHABLE TREAD FOR TRACTION-WHEELS.

1,377,321.   Specification of Letters Patent.   Patented May 10, 1921.

Application filed November 17, 1917. Serial No. 202,666.

*To all whom it may concern:*

Be it known that I, HENRY A. DENISON, a citizen of the United States, and a resident of Waterville, in the county of Kennebec and State of Maine, have invented certain new and useful Improvements in a Detachable Tread for Traction-Wheels, of which the following is a specification.

The present invention relates to wheels, and more particularly to a tread structure for application to traction wheels, such as those of motor vehicles and the like An object of the present invention is to provide a tread which is relatively wide; which may be easily applied to the driving wheels of motor vehicles; a tread structure which may be used in connection with runners or the like on vehicles to be driven through snow; a detachable tread which when applied broadens the surface contact between the traction wheel and the ground; and a detachable tread portion for a traction wheel which prevents the cutting of the traction wheel in soft ground, snow or the like, and which tends to tamp the road and prevent the formation of ruts or depressions in the same.

The invention further aims at the provision of a detachable tread of this character which is of relatively few parts; which may be easily applied to and removed from the ordinary carrier wheels of motor vehicles; and a detachable tread which may be economically manufactured and handled.

The above, and various other objects and advantages of this invention will be in part described, and in part understood, from the following detailed description of the present preferred embodiment, the same being illustrated in the accompanying drawings, wherein:—

Figure 1 is a side elevation of a part of a carrier wheel having the detachable tread of this invention applied thereto.

Fig. 2 is a transverse section through the same taken substantially on the line 2—2 of Fig. 1.

Fig. 3 is an outer face view of one of the detachable slats employed.

Fig. 4 is an edge view of the same.

Fig. 5 is an inner face view of the slats.

Fig. 6 is a view similar to Fig. 1 disclosing a slightly modified form of the invention.

Fig. 7 is a transverse section taken on the line 7—7 of Fig. 6.

Fig. 8 is a detail side elevation of one of the attaching straps employed.

Fig. 9 is an inner face view of the same.

Fig. 10 is a fragmentary perspective view of a number of the tread slats, showing the lacing for holding the same together.

Fig. 11 is a top plan view of the same.

Fig. 12 is a detail enlarged side elevation of a clamping device for holding ends of the intermediate lacing together.

Fig. 13 is an edge view of a securing and tightening device for holding one of the lateral lacings taut.

In the accompanying drawings, the device of this invention is disclosed as mounted upon a carrier wheel for automobiles and the like, which is of usual construction, and which embodies a hub A supporting spokes B upon which is mounted a felly C, the latter carrying a rim D upon which is placed a pneumatic tire E.

The detachable tread of this invention comprises a circumferential row of spaced apart and transversely extending slats 15 which are laced together by strands or cables 16 and 17. The lateral cables 16 preferably extend twice around the circumference of the tread portion to provide two strands, and the strands are oppositely laced between and over the adjacent slats 15. To maintain the strands or cables 16 from slipping endwise from the slats, the latter are provided in their outer and inner faces with grooves 18 and 19 respectively. Each cable 16 is of single length, and the slats 15 are preferably so arranged as to be of an odd number, and the extremities of each cable 16 terminate beneath the end of the one of the slats 15, as shown in Fig. 1.

The intermediate lacing or strand 17 is preferably of single length or ply and extends across the intermediate portions of the slats 15 and is held thereat by circumferential grooves 20 formed across the outer faces of the slats 15. The opposite ends of the cable or strand 17 are brought together at one of the spaces between and adjacent pair of the slats 15 and are secured or clamped in taut relation through a yoke 21 which has threaded nuts on opposite ends and provided with a sliding clamp bar 22. The bar 22 is adapted to be advanced by the nuts against the overlapping ends of the cable 17 to bind the latter in the yoke 21 and hold the cable taut.

The slats 15 are of a length considerably greater than the width of the tire E, and for the purpose of supporting the slats for contact with the road throughout the length of the slats, a supplemental rim 23 carrying a tire 24, is employed and is held against the outer side of the traction wheel. The rim 23 may be provided with a supporting felly 25 corresponding in thickness and diameter to the felly C of the wheel body. The felly 25 and the parts carried thereby are held against the wheel body by straps 26 which engage between the spokes B and against the inner faces of the fellies C and 25 which project at opposite ends laterally beyond the fellies and have secured therethrough radially extending tie-rods 27. The tie-rods 27 are preferably headed and have the heads thereof countersunk in openings 28 formed in the opposite end portions of the slats 15. The tie-rods 27 pass through the slats 15 and the straps 26, and are provided upon their inner threaded ends with clamping nuts adapted to draw the straps 26 against the inner sides of the fellies and thus bind the fellies, the rims and the tires together. The slats 15 constitute the tread portion of the device and the outer surfaces thereof are adapted to contact with the roadway. The clamp 21 is arranged between adjacent notches or recesses 29 which are formed in the adjacent slats 15, the clamp lying substantially within the contour of the tread. As shown in Fig. 2, the clamp 21 lies between the tires E and 24, and the rods 27 are adapted to bear against the outer sides of the tires, the rims and the fellies to hold the same together. Any desired number of the tie-rods 27 may be employed for holding said spaced apart slats 15 against the treads of the tires, and for holding the corresponding number of straps 26 against the inner faces of the tire supports to hold the parts from relative movement either circumferentially or laterally.

The free ends of the lateral laces 16 are held together by a clamp 30 which may comprise a pair of opposed jaws as shown in Fig. 13, secured together by bolts or the like, and clamping the overlapping ends of the laces. The clamp 30 is provided with an eye 31 at one end through which a link 32 is secured, the link 32 extending radially inward and passing through a strap 33 which extends transversely across the inner sides of the fellies of the supporting structure and which is secured at its opposite end to a similar link 32 which supports a similar clamp 30. The inner ends of the link 32 are suitably threaded and are provided with clamping nuts thereon adapted to be turned outwardly over the link to draw the clamp 30 radially inward and thus tighten the laces 16.

In Figs. 6 to 9 inclusive, there is shown a modified form of supporting means for the tread structure. In this form the outer tire 24 is supported upon the rim 23 which instead of being mounted upon a felly, is mounted upon supporting blocks 34 which are secured to the transverse strap 26. As shown particularly in Figs. 8 and 9, the blocks 34 are of slightly greater width than that of the strap 26 and are provided in their lower side with transverse slots receiving the strap therethrough. Screws 35 or the like, pass through the straps and into the blocks for holding the parts together.

As shown to advantage in Figs. 10 and 11, the pairs of strands which constitute the outer lacings 16 each extend in substantially parallel planes at right angles to the axis of the wheel to prevent scraping of the cables or strands which form the lacings and to retain the slats 15 in circumferential alinement. For this purpose the outer and inner slots or recesses 18 and 19 in the opposite faces of the slats 15, are arranged alternately in laterally offset relation so that the upper slot or recess in one slot registers longitudinally with the lower slot or recess in the next adjacent slat. These recesses or slots 18 and 19 are of sufficient depth to receive the lacings 16 and 17 therein to prevent undue wear of the laces and ground contact of the same. The outer surfaces of the slats 15 are adapted to take up wear and friction between the carried wheel and the ground.

It is of course understood that various changes and modifications may be made in the details of construction and design of the above specifically described parts of this invention without departing from the spirit thereof, such changes and modifications being restricted only by the scope of the following claims.

What is claimed is:

1. The combination with a wheel body having a tire thereon, of a separate rim, a second tire mounted on said rim, interlaced slats adapted to extend across the tread portions of both tires, and means binding the slats upon the tires and embracing said rim and said wheel body for rigidly securing the separate rim and the second tire beneath said slats.

2. The combination with a wheel body having a tire thereon, of a separate rim with a tire, and traction means securing the second rim and tire against the side of the wheel body and its tire, the traction means comprising a plurality of interlaced tread elements of a width to extend beyond the outer sides of the tires and clamping means engaging the opposite ends of the tread elements and embracing the tires and the rim and wheel body for rigidly connecting all of the parts together.

HENRY A. DENISON.